United States Patent [19]
Mourier

[11] 3,943,530
[45] Mar. 9, 1976

[54] TRACING APPARATUS WITH SUCTION PAPER CONTROL MEANS

[75] Inventor: Jean Mourier, Savigny-sur-Orge, France

[73] Assignee: Benson, Creteil, France

[22] Filed: Aug. 13, 1974

[21] Appl. No.: 497,041

[52] U.S. Cl. .............................. 346/136; 242/182
[51] Int. Cl.² ................................. G01D 15/28
[58] Field of Search ........... 346/136; 242/182, 183, 242/184, 185, 68.3; 226/95, 97

[56] References Cited
UNITED STATES PATENTS

| | | | |
|---|---|---|---|
| 3,202,373 | 8/1965 | Reader | 242/182 |
| 3,254,854 | 6/1966 | Deighton et al. | 242/182 X |
| 3,305,873 | 2/1967 | Mourier | 346/136 X |
| 3,722,929 | 3/1973 | Gilman | 242/68.3 |
| 3,723,981 | 3/1973 | Stange | 226/97 X |

Primary Examiner—Joseph W. Hartary
Attorney, Agent, or Firm—Karl W. Flocks

[57] ABSTRACT

The invention relates to a tracing apparatus operating automatically on the basis of digital imputs.

A buffer-loop is formed in the paper band between each drive roll and the control drum, and the loops so formed are balanced by a loop corrector/reader device. In one prior art apparatus, this device includes photoelectric cells.

The tracing apparatus is characterized in that it includes three suction chambers, one for each buffer-loop and a third central chamber beneath the control drum, whereby two saggings of the paper are obtained on either side of the control drum that are entirely independent of the two buffer-loops.

3 Claims, 3 Drawing Figures

TRACING APPARATUS WITH SUCTION PAPER CONTROL MEANS

This invention relates to a tracing apparatus operating automatically on the basis of digital inputs.

In apparatus of this kind, the digital pulses are applied to two independent reversible inching motors which drive a tracing head and a control drum over which runs a paper band. The tracing head reproduces the ordinates and the control drum the abscissae. A paper winding and unwinding arrangement includes two two-way-rotating drive rolls, the control drum being placed therebetween and parallel thereto.

A buffer-loop is formed in the paper band between each drive roll and the control drum, and the loops so formed are balanced by a loop corrector/reader device. In one prior art apparatus, this device includes photoelectric cells.

A suction arrangement assists the formation of the loops and ensures that the paper is wrapped to the maximum around the control drum and that the latter is properly driven.

The suction effect consequently operates both between the two buffer-loops (which causes the paper to sag beneath the drum, on either side thereof) and upon the loops themselves (which tend to lengthen). This sagging and lengthening are mutually contradictory, and therefore the total independence desirable for the control drum in relation to the loops is not achieved.

The present invention overcomes this drawback and provides a tracing apparatus which is characterized in that it includes three suction chambers, one for each buffer-loop and a third central chamber beneath the control drum, whereby two characterized saggings of the paper are obtained on either side of the control drum that are entirely indepenent of the two buffer-loops.

An intermediate roll establishes a line of determinate leakproofness between a sag and a buffer-loop.

Leakage adjustment means are provided for each buffer-loop chamber in order to fetch the depression therein to a value below that in the central chamber.

A loop corrector/reader device with a depression detector is provided in each buffer-loop chamber.

The description which follows with reference to the accompanying non-limitative exemplary drawing will give a clear understanding of how the invention can be carried into practice.

In the drawing,

FIG. 3 is a cross-sectional view on an enlarged scale of a roll mandrel.

Figure 1:
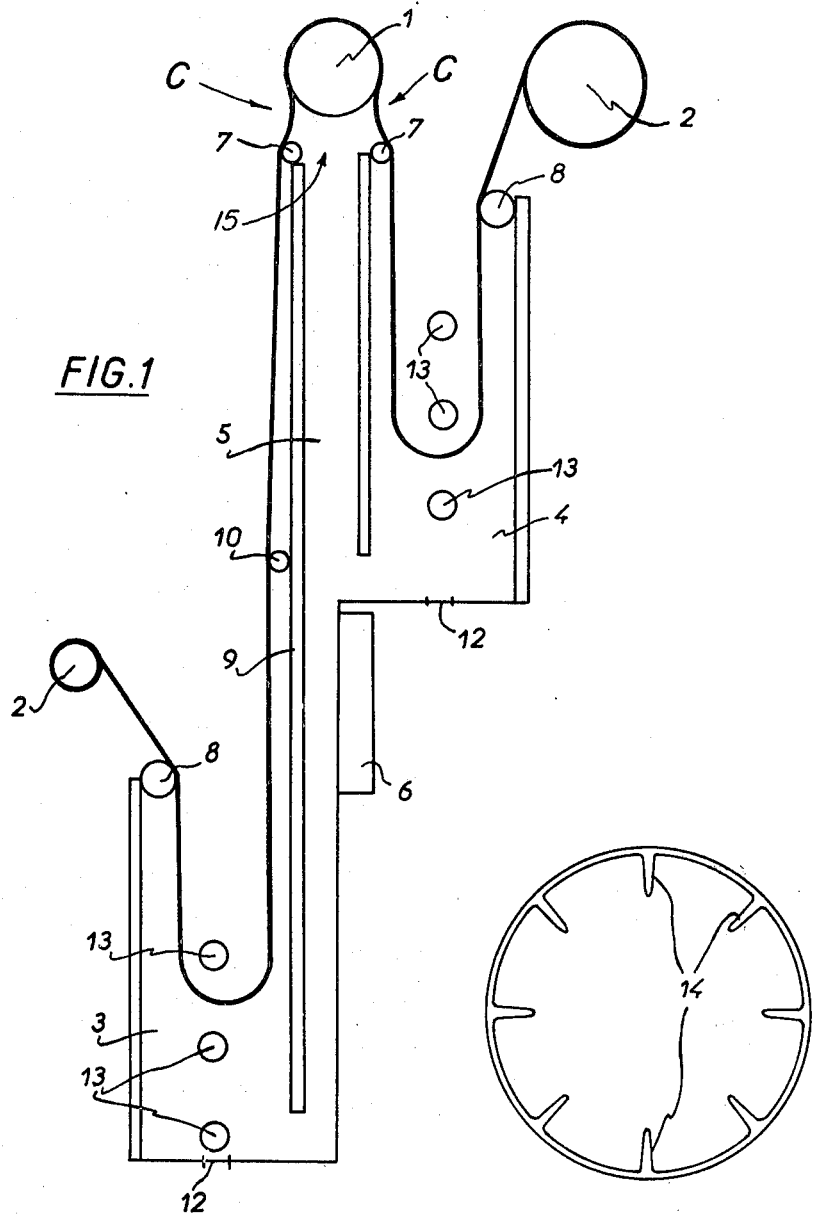
FIG. 1 shows in schematic side elevation a tracing apparatus according to the invention.
Figure 2:
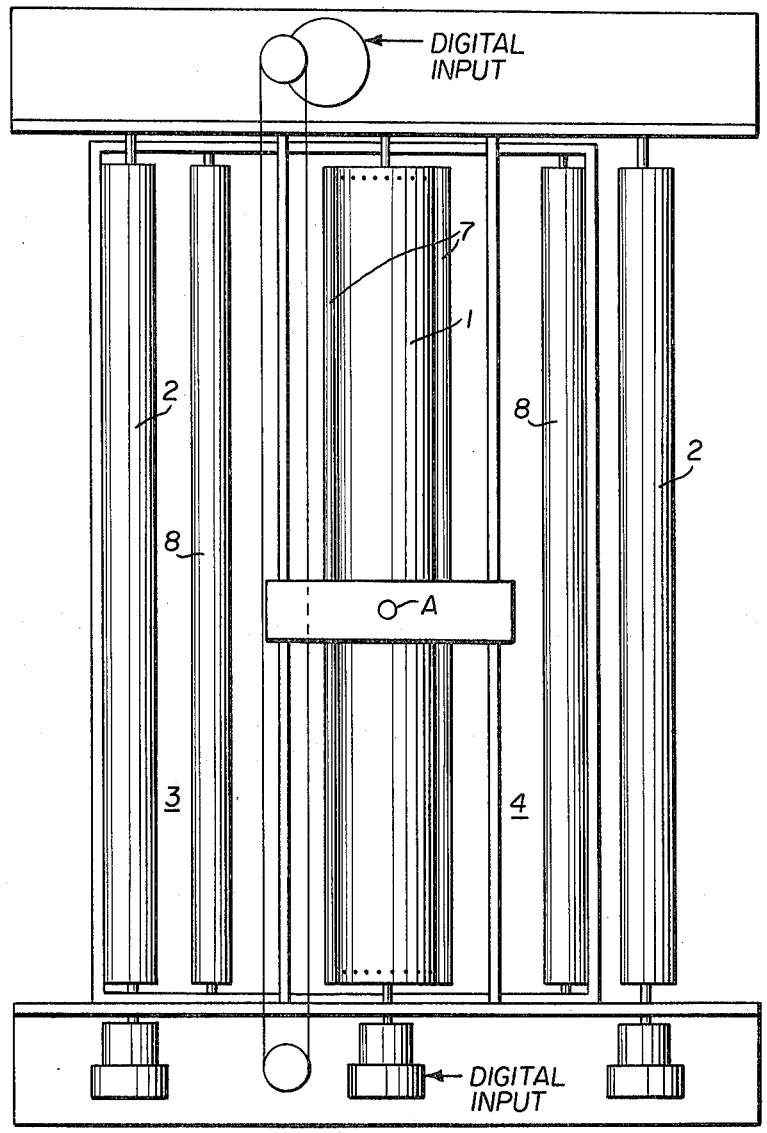
FIG. 2 is a view looking from above said apparatus.

In the embodiment illustrated in the drawing, the tracing apparatus includes a tracing head A and a control drum 1 which is contacted by a paper band which is rolled onto two winding/unwinding rolls 2 arranged parallel to and on either side of the control drum. A buffer-loop is formed between each roll 2 and the drum 1.

The apparatus further includes three suction chambers, a side chamber 3 for one of the loops, a side chamber 4 for the other loop and a third central chamber 5 ending at a slot 15 extending beneath the control drum and parallel therewith.

The three chambers intercommunicate through their lower ends and have a common suction source 6.

An intermediate roll 7 is supported on each of the upper edges of the slot 15 of the central chamber 5, and two further intermediate rolls 8 are supported on the upper external edges of chambers 3 and 4 respectively.

In order to permit wider observation of the paper sheet receiving the tracing, one of these side chambers (chamber 3) is placed at a lower level than the other chamber and accordingly clears one of the walls of the central chamber. This wall 9 forms an observation surface before which the paper band travels. An intermediate roll 10 is placed on this surface to prevent contact of the paper therewith.

A leakage adjustment device is provided at the bottom of each of chambers 3 and 4. Such device may be a manually adjustable air damper or a counterweighted valve for automatically regulating the leakage or merely a simple orifice 12.

The buffer-loops which move through chambers 3 and 4 are balanced by means of a loop detection-correction device comprising at least two depression detectors 13. In the embodiment illustrated in the drawing, three such detectors are provided.

These detectors operate by on-off control and are preferably of the kind described and illustrated in U.S. patent application Ser. No. 495,892 filed Aug. 7, 1974 by the Applicant in respect of a "Depression detector."

The tracing apparatus according to this invention functions as follows:

The suction assists the formation of the buffer-loop in each side chamber by drawing it downwards, and this irrespective of the formation of the two lateral sags $c$ beneath and on either side of the control drum.

The rolls 7 establish two lines of determinate leakproofness between the sags $c$ and the buffer-loops, whereby central chamber 5 is isolated from the two side chambers 3 and 4.

Further, the fact that the depression in each buffer-loop chamber is brought to a value below that in the central chamber makes it possible to ensure satisfactory amplitude for the lateral sags $c$.

The means for adjusting the leakage from side chambers 3 and 4 have the added advantage of maintaining a constant leakage section irrespective of variations in the paper band width, which may or may not be constant.

Prolonged rotation of control drum 1 in either direction may cause the buffer-loop located downflow thereof to be lengthened. Such lengthened loop is shown in chamber 4. It uncovers and vents two detectors out of three, whereby only the third detector nearest the bottom of the chamber transmits a signal triggered by the depression. This signal may be used to produce winding motion of the roll 2 which, in the case considered herein, is located downflow of drum 1. This motion in turn shortens the loop.

A shortening of the other loop, shown in chamber 3, exposes two out of three detectors to the depression, and the signals transmitted can be used to cause payout motion of the roll 2 located upflow of drum 1, thereby causing said loop to lengthen.

It goes without saying that changes and substitutions may be made in the preferred exemplary embodiment herein described, without departing from the scope of the invention as set forth in the appended claims.

Further, the hollow mandrels of the take-up/pay-out rolls are designed with an internal ribbed profile 14 in order to distribute the driving torque over a plurality of points and eliminate the noise and peening of the drive dogs occuring in prior art systems.

I claim:

1. In a tracing apparatus functioning automatically on the basis of digital inputs comprising:
    a tracer head,
    a paper band control drum,
    paper band winding-unwinding means having two winding-unwinding rolls positioned on either side of said control drum,
    suction means for assisting the formation of two buffer-loops,
    two chambers receiving said buffer-loops and connected to said suction means, said control drum being located between said chambers,
    loop reader-correcter means provided in each of said chambers,
    a central suction slot extending underneath, all along said control drum and parallel therewith,
    a roll disposed on each longest side of said suction slot so as to establish a line of leakproofness between it and the paper band,
whereby two sags are freely formed in the paper band beneath and on either side of said control drum, the paper band being thus wrapped to the maximum around said control drum.

2. An apparatus in accordance with claim 1 further characterized by:
    said suction slot being connected to said suction means,
    leakage adjustment means being associated to each of said buffer-loop chambers, whereby the depression in said chambers is caused to be fetched to a value below that in said suction slot.

3. An apparatus in accordance with claim 1 further characterized by:
    a central casing ending at said suction slot,
    one of said chambers being placed at a lower level than said other chamber and said central casing,
whereby one of the walls of said central casing forms an observation surface before which the paper band travels.

* * * * *